United States Patent [19]
Nakayama et al.

[11] Patent Number: 5,277,966
[45] Date of Patent: Jan. 11, 1994

[54] UNCOATED WOVEN FABRIC AND METHOD OF MANUFACTURING SAME

[75] Inventors: Yoshikazu Nakayama; Motonobu Kitagawa, both of Hikone, Japan

[73] Assignee: Takata Corporation, Tokyo, Japan

[21] Appl. No.: 981,203

[22] Filed: Nov. 25, 1992

[30] Foreign Application Priority Data

Dec. 10, 1991 [JP] Japan .................................. 3-325773

[51] Int. Cl.⁵ .............................................. D03D 3/00
[52] U.S. Cl. .................................. 428/225; 156/308.2; 280/728 R; 428/257; 428/296
[58] Field of Search ............... 428/225, 257, 258, 259, 428/296; 280/728; 156/308.2

[56] References Cited

U.S. PATENT DOCUMENTS

| | | | |
|---|---|---|---|
| 4,533,594 | 8/1985 | Buchanan | 428/257 |
| 5,073,418 | 12/1991 | Thornton et al. | 428/225 |
| 5,093,163 | 3/1992 | Krummheuer et al. | 428/225 |
| 5,110,666 | 5/1992 | Menzel et al. | 428/36.8 |

FOREIGN PATENT DOCUMENTS

| | | |
|---|---|---|
| 735236 | 8/1955 | United Kingdom . |
| 1257677 | 12/1971 | United Kingdom . |
| 2226339 | 6/1990 | United Kingdom . |
| 2251253 | 7/1992 | United Kingdom . |
| 2251410 | 7/1992 | United Kingdom . |
| 2252983 | 8/1992 | United Kingdom . |

Primary Examiner—James J. Bell
Attorney, Agent, or Firm—Armstrong, Westerman, Hattori, McLeland & Naughton

[57] ABSTRACT

A woven fabric is wove using warps (6) and wefts (7) having coated threads (6a) and (7a), respectively, every other thread, with the remaining threads being uncoated threads (6b), (6c). The coated threads (6a), (7a) are melted by a heat setting treatment, thereby fusing the coated threads (6a) in the warps (6) to the wefts (7) and the coated threads (7a) in the wefts (7) to the warps (6). The woven fabric becomes an uncoated woven fabric on which a thin coating film has not been formed. Accordingly, the uncoated woven fabric has a predetermined amount of air permeability. The threads will not become frayed or tattered and the amount of air permeability will not change even when the uncoated woven fabric is cut.

9 Claims, 3 Drawing Sheets (a) (b)

UNCOATED WOVEN FABRIC AND METHOD OF MANUFACTURING SAME

BACKGROUND OF THE INVENTION

This invention relates to an uncoated woven fabric, which comprises a woven fabric, ideal for use in an air bag for vehicles or the like, as well as a method of manufacturing the uncoated woven fabric.

An air bag device provided on a stationary portion of the vehicle body of an automobile in front of a seat of the automobile has an air bag inflated instantaneously by the pressure of a reaction gas emitted by an inflator secured to the steering wheel or dashboard, thereby protecting a seated passenger from injury caused by a vehicular collision. Thus, the air bag device performs a very important function.

The shape of the air bag in such an air bag device differs depending upon the location at which the air bag is mounted. For example, as shown in FIG. 6, an air bag 1 for the driver's seat comprises a substantially circular bag body having a disk-shaped base fabric 1a attached to a fixed portion of the vehicle body, such as the steering wheel, and a circular base fabric 1b facing the driver. The base fabrics 1a, 1b are superimposed and sewn together at A along their circumferential edges and turned over. The air bag 1 has an opening 2 provided in the base fabric 1a, which is secured to the vehicle body, into which the inflator (not shown) that generates the reaction gas is inserted. The air bag 1 is further provided with vent holes 3 from which the reaction gas is discharged after the driver is impacted against the air bag 1.

As shown in FIG. 7, a passenger air bag 4 is provided in the instrument panel and has a complicated shape owing to the fact that the space between the assistant driver's seat and the instrument panel is large. The passenger air bag 4 includes a front panel 4a, a rear panel 4b and a pair of side panels 4c, 4d. The edges of these panels are overlapped and sewn together and turned over to form the air bag 4.

In general, the driver and passenger air bags 1, 4 both consist of a synthetic resin such as polyimide resin and are formed from a suitable number of base fabrics in which a thin coating film 5 (shown only on the driver's air bag 1 in FIG. 6) of chloroprene rubber or silicone rubber is provided on the inner surface. By providing the thin coating film on the inner surface of the base fabric, the base fabric is protected from the high temperature and high pressure of the reaction gas jetted from the inflator when the air bag is inflated.

In order to lighten the air bag device and make it more compact, there has recently been greater demand for an air bag base fabric that can lighten the air bag and reduce the volume of the package. Since progress has been made in lowering the temperature of the reaction gas by virtue of an improvement in the performance of the inflator and the development of aspirator-type air bag devices, air bags which use a fabric on which a thin coating film is not formed (such a fabric shall also be referred to as an "uncoated fabric" hereinafter) have become the focus of interest. Since the uncoated fabric does not have a thin coating film such as chloroprene rubber or silicone rubber formed thereon, the thickness of the base fabric is reduced by an amount equivalent to the thickness of the thin coating film, and therefore the air bag is reduced in both weight and package volume.

In a case where an uncoated woven fabric is used, there are occasions where the threads of the uncoated woven fabric become frayed or tattered when the fabric is subjected to cutting. In general, when such an uncoated woven fabric is subjected to a heat-resistance aging test in which it is maintained at a temperature of 80°~120° C. for 600~1000 hrs, the threads becomes ball shaped owing to contraction of the threads and locations are produced where the spaces between threads widen and other locations where the spaces become small. As a result, there are instances where there is a change in properties, such as a change in the amount of air permeability of the base fabric.

SUMMARY OF THE INVENTION

An object of the present invention is to provide an uncoated woven fabric, as well as a method of manufacturing the same, in which the threads will not become frayed or tattered when the fabric is cut, and in which there will be no change in such properties as amount of air permeability after cutting.

According to the present invention, the foregoing object is attained by providing an uncoated woven fabric consisting of a woven fabric woven from warps and wefts and not having a thin coating film formed thereon, characterized in that a predetermined number of threads of at least one of the warps and wefts comprise coated threads coated with a coating material, and the coated threads are fixed to the threads of the other of the warps and wefts.

A method of manufacturing the above-mentioned uncoated woven fabric according to the present invention is characterized by using a predetermined number of coated threads as the threads of at least one of the warps and wefts, forming a woven fabric by weaving the coated threaded and uncoated threads, and fusing the coated threads to the threads of the other of the warps and wefts by performing a heat setting treatment in which the woven fabric is held at a predetermined temperature for a predetermined period of time.

In the uncoated woven fabric and method of manufacturing the same according to the present invention described above, a predetermined number of threads of at least one of the warps and wefts comprise coated threads coated with a coating material, and the coated threads are fixed to the threads of the other of the warps and wefts. As a result, the threads will not become frayed or tattered even when the uncoated woven fabric is cut to prescribed dimensions. In addition, owing to the coated threads, the spaces between the mutually adjacent threads in the threads of the other of the warps and wefts are prevented from widening or narrowing when a heat-resistance aging test is performed. As a result, the amount of air permeability does not change but remains at a substantially constant value.

Still other objects and advantages of the invention will in part be obvious and will in part be apparent from the specification.

The invention accordingly comprises the features of construction, combinations of elements and arrangement of parts which will be exemplified in the construction hereinafter set forth, and the scope of the invention will be indicated in the claims.

DESCRIPTION OF THE PREFERRED EMBODIMENTS

Embodiments of the present invention will now be described with reference to the drawings.

Figure 1:
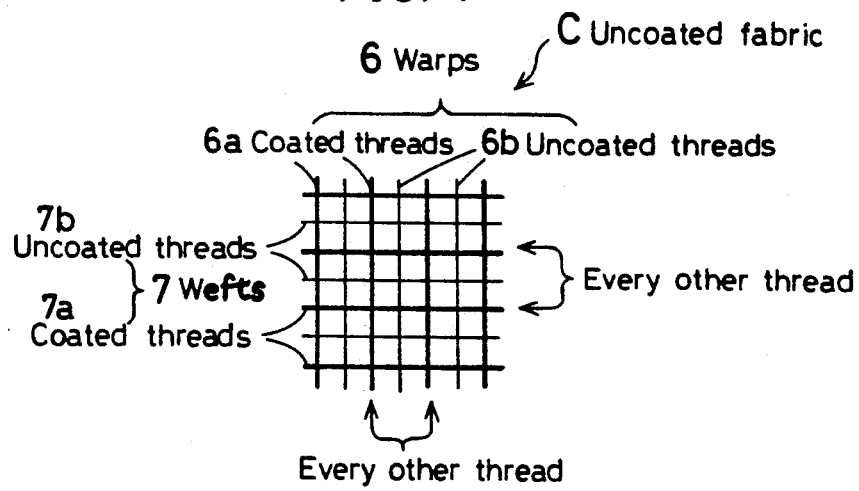
FIG. 1 is a partially enlarged plan view showing an embodiment of an uncoated woven fabric according to the present invention.

FIG. 1 is a partially enlarged plan view showing an embodiment of an uncoated woven fabric according to the present invention.

As shown in FIG. 1, an uncoated woven fabric C is woven from warps 6 and wefts 7 in the same manner as in the prior art. In accordance with this embodiment, every other thread of the warps 6 is coated to provide alternating coated threads 6a, and every other thread of the wefts 7 is coated to provide alternating coated threads 7a. The coating material for coating the coated threads 6a, 7a may be any which will fuse the threads together when a base fabric is heat-set, as will be described later. An example of such a material is a thermoplastic resin.

The woven fabric using the coated threads 6a, 7a as every other one of the warps 6 and wefts 7, respectively, is subjected to a heat setting treatment at a predetermined temperature for a predetermined period of time. In general, the heat setting treatment involves maintaining the woven fabric at a temperature of 190° C. for about 40 sec after the fabric has been washed. By virtue of this treatment, the coated threads 6a, 7a are melted so that the coated threads 6a in the warps 6 are fused to the wefts 7, namely to the coated threads 7a and uncoated threads 7b in the wefts 7 while the coated threads 7a in the wefts 7 are fused to the warps 6, namely to the coated threads 6a and uncoated threads 6b in the warps 6. The woven fabric thus formed serves as an uncoated woven fabric, namely a woven fabric on which a coating film has not been formed. Accordingly, the uncoated woven fabric has a prescribed amount of air permeability.

Figure 6:
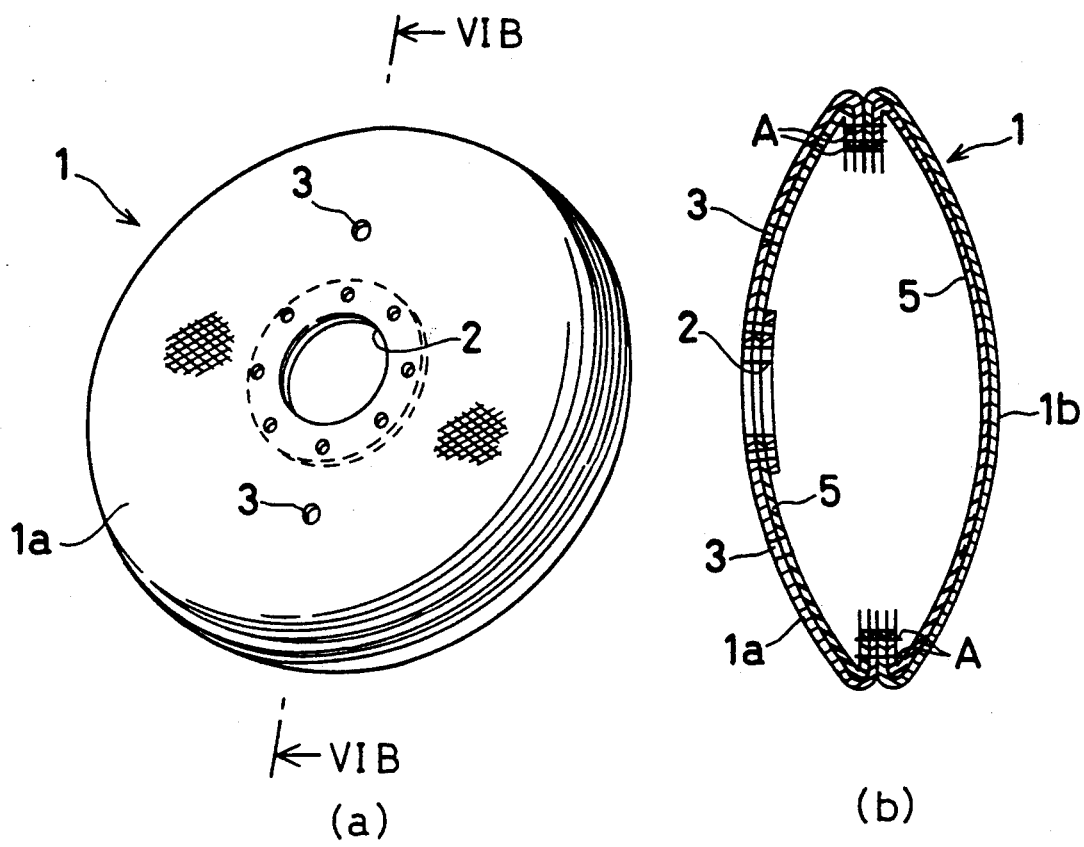
FIG. 6 is a diagram stowing an example of a driver's air bag according to the prior art.

The woven fabric in which the coated threads 6a in the warps 6 are fused to the wefts 7 and the coated thread 7a in the wefts 7 are fused to the warps 6 is cut to appropriate dimensions in accordance with the purpose of use, thereby forming a base fabric. In this case, the fact that the threads are fused together assures that they will not fray or become tattered when the woven fabric is cut. When a heat-resistance aging test is conducted, the filaments are prevented from becoming ball shaped, thereby preventing the gaps between the threads from increasing or decreasing in size. As a result, there is almost no change in the amount of air permeability. Accordingly, when the uncoated woven fabric C is used to form the aforementioned air bag, such as the driver's air bag 1 shown in FIG. 6, the base fabric 1a secured to the vehicle body is formed by an uncoated woven fabric having a comparatively large amount of air permeability, and the basic fabric 1b facing the driver is formed by an uncoated woven fabric having a comparatively small amount of air permeability or by a fabric on which a thin coating film has been formed. As a result of such a construction, the amount of air permeability can be adjusted to a desired value. As a consequence, the reaction gas within the air bag after the bag has been impacted by the driver can vent in appropriate fashion. Accordingly, it is unnecessary to provide vent holes 3 with which the conventional air bag is furnished. This makes it possible to reduce the number of manufacturing steps.

Figure 7:
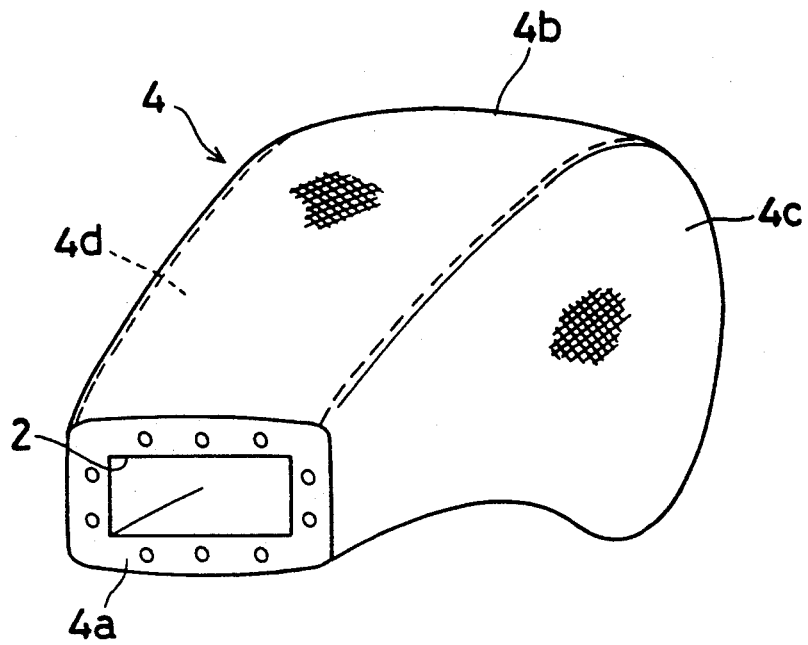
FIG. 7 is a diagram showing an example of a passenger's air bag according to the prior art.

In the air bag 4 for the passenger shown in FIG. 7, the side panels 4c, 4d may be formed by an uncoated woven fabric having a comparatively large amount of air permeability, and the front panel 4b and rear panel 4a may be formed by an uncoated woven fabric having a comparatively small amount of air permeability, whereby the reaction gas within the air bag after the bag has been impacted by the driver can vent in appropriate fashion.

FIGS. 2 through 5 are partially enlarged plan views showing other embodiments of the uncoated woven fabric according to the present invention. Elements identical with those of the foregoing embodiment are designated by like reference characters and need not be described again in detail.

Figure 2:
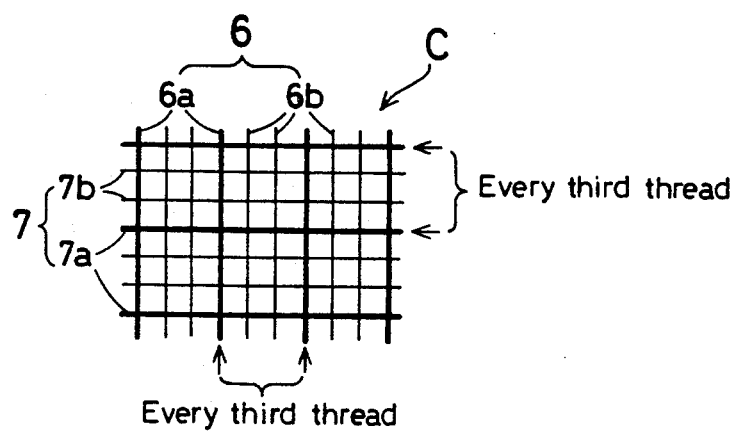
FIG. 2 is a partially enlarged plan view showing another embodiment of an uncoated woven fabric according to the present invention.
Figure 3:
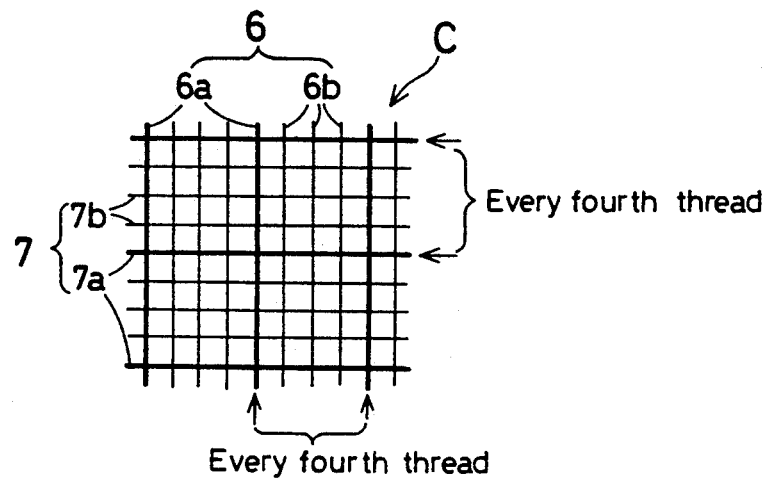
FIG. 3 is a partially enlarged plan view showing still another embodiment of an uncoated woven fabric according to the present invention.
Figure 4:
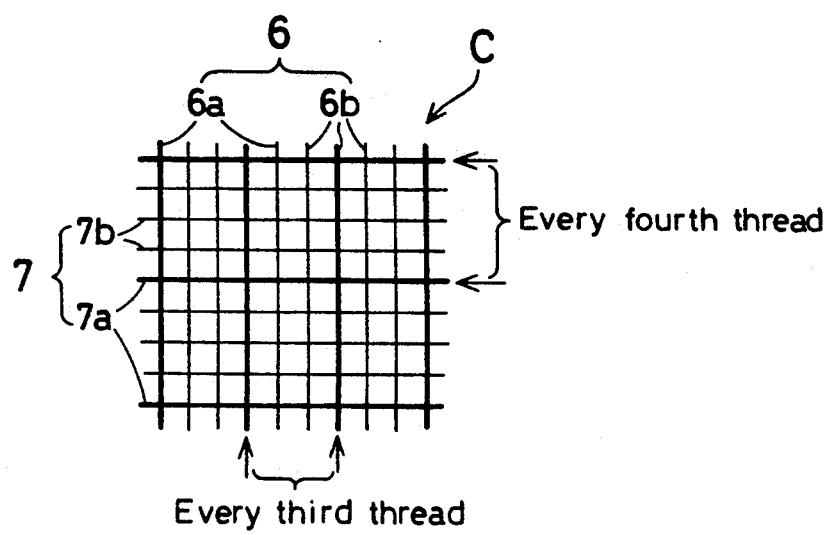
FIG. 4 is a partially enlarged plan view showing a further embodiment Of an uncoated woven fabric according to the Present invention.
Figure 5:
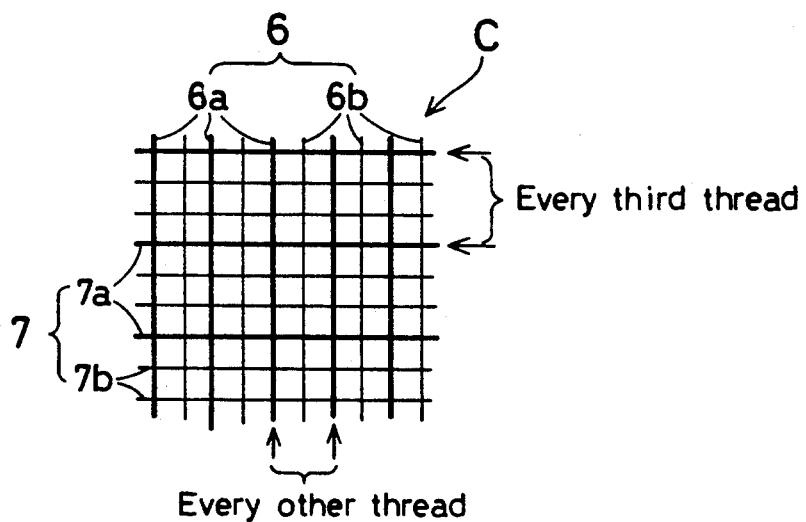
FIG. 5 is a partially enlarged plan view showing a further embodiment of an uncoated woven fabric according to the present invention.

In the embodiment shown in FIG. 2, every third thread of the warps 6 is the coated thread 6a, and every third thread of the wefts 7 is the coated thread 7a. In the embodiment shown in FIG. 3, every fourth thread of the warps 6 is the coated thread 6a, and every fourth thread of the wefts 7 is the coated thread 7a. In the embodiment shown in FIG. 4, every third thread of the warps 6 is the coated thread 6a, and every fourth thread of the wefts 7 is the coated thread 7a. In the embodiment shown in FIG. 5, every other thread of the warps 6 is the coated thread 6a, and every third thread of the wefts 7 is the coated thread 7a. In each of these embodiments, actions and effects identical with those of the first embodiment are obtained. Which particular embodiment of the uncoated woven fabric is employed may be selected appropriately depending upon the purpose of use. It should be noted that the present invention is not limited to the foregoing embodiments since the coated threads 6a, 7a may be arranged at suitable intervals besides those mentioned above.

Thus, in accordance with the present invention, as described above, the threads can be prevented from becoming frayed or tattered when the uncoated woven fabric is cut. In addition, a change in the properties of the uncoated woven fabric, such as a change in the amount of air permeability, caused by external conditions is prevented, and therefore such properties as the amount of air permeability can be held substantially constant. Accordingly, by employing the uncoated woven fabric of the present invention as the base fabric of a vehicular air bag, for example, an air bag exhibiting a desired amount of air permeability can be manufactured in simple fashion. As a result, there are cases in which the vent holes that are provided in the conventional air bag on which the thin coating film is formed can be eliminated. Moreover, the base fabric of the air bag can be reduced in thickness by an amount equivalent to the coating film, thereby making it possible to achieve a greater reduction in weight and to reduce the package volume of the air bag.

As many apparently widely different embodiments of the present invention can be made without departing from the spirit and scope thereof, it is to be understood that the invention is not limited to the specific embodiments thereof except as defined in the appended claims.

What is claimed is:

1. A woven fabric woven from warps and wefts and not having a thin coating film formed thereon, wherein at least one of said warps and said wefts comprises both coated and uncoated threads, said coated threads being coated with a coating material, and said coated threads being fixed to the threads of the other of said warps and said wefts.

2. the woven fabric according to claim 1, wherein said coated threads are arranged at predetermined intervals between said uncoated threads.

3. The woven fabric according to claim 2, wherein both said warps and said wefts comprise said coated and uncoated threads, the coated threads in said warps are arranged at predetermined intervals between the respective uncoated threads, and the coated threads in said wefts are arranged at intervals the same as or different from the intervals of the coated threads in said warps.

4. The woven fabric according to claim 3, wherein the coated threads in said warps are arranged such that from one to three uncoated threads are provided for every coated thread.

5. The woven fabric according to claim 4, wherein the coated threads in said wefts are arranged such that from one to three uncoated threads are provided for every coated thread.

6. An air bag formed of a woven fabric woven from warps and wefts and not having a thin coating film formed thereon, wherein at least one of said warps and said wefts comprises both coated and uncoated threads, said coated threads being coated with a coating material, and said coated threads being fixed to the threads of the other of said warps and said wefts.

7. An air bag formed of the woven fabric according to claim 1, wherein said coated threads are arranged at predetermined intervals between said uncoated threads.

8. An air bag formed of the woven fabric according to claim 2, wherein both said warps and said wefts comprise said coated and uncoated threads, the coated threads in said warps are arranged at predetermined intervals between the respective uncoated threads, and the coated threads in said wefts are arranged at intervals the same as or different from the intervals of the coated threads in said warps.

9. A method of manufacturing the woven fabric defined in claim 1 comprising the steps of:
   providing said coated and uncoated threads for said at least one of said warps and said wefts;
   forming a woven fabric by weaving said coated and uncoated threads; and
   fusing the said coated threads to the threads of the other of said warps and said wefts by performing a heat setting treatment in which said woven fabric is held at a predetermined temperature for a predetermined period of time.

* * * * *